(12) United States Patent
Frankenberger

(10) Patent No.: US 12,221,227 B2
(45) Date of Patent: Feb. 11, 2025

(54) SYSTEM AND METHOD FOR POSITIONING VEHICLE COMPONENTS FOR ASSEMBLY

(71) Applicant: Airbus Operations GmbH, Hamburg (DE)

(72) Inventor: Eckart Frankenberger, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/460,887

(22) Filed: Sep. 5, 2023

(65) Prior Publication Data
US 2024/0092504 A1 Mar. 21, 2024

(30) Foreign Application Priority Data
Sep. 15, 2022 (EP) ..................... 22195998

(51) Int. Cl.
*B64F 5/10* (2017.01)
*G01S 5/02* (2010.01)
*G01S 5/14* (2006.01)
*G01S 13/46* (2006.01)

(52) U.S. Cl.
CPC .............. *B64F 5/10* (2017.01); *G01S 5/0284* (2013.01); *G01S 5/14* (2013.01); *G01S 13/46* (2013.01); *G01S 2013/466* (2013.01)

(58) Field of Classification Search
CPC .... B23P 21/00; B64F 5/10; G01S 5/14; G01S 5/0284; G01S 13/46; G01S 2013/466
See application file for complete search history.

(56) References Cited

U.S. PATENT DOCUMENTS

| | | | |
|---|---|---|---|
| 2009/0112349 A1 | 4/2009 | Cobb et al. | |
| 2010/0320327 A1 | 12/2010 | Sayilgan | |
| 2015/0013162 A1 | 1/2015 | Best et al. | |
| 2015/0298824 A1* | 10/2015 | Larson | B64F 5/10 29/559 |
| 2021/0163153 A1 | 6/2021 | Yamane | |

FOREIGN PATENT DOCUMENTS

| | | |
|---|---|---|
| EP | 2824439 A2 | 1/2015 |
| EP | 3604141 A1 | 2/2020 |

OTHER PUBLICATIONS

European Search Report for corresponding European Patent Application No. 22195998 dated Feb. 21, 2023.

* cited by examiner

*Primary Examiner* — Moshe Wilensky
(74) *Attorney, Agent, or Firm* — Greer, Burns & Crain, Ltd.

(57) ABSTRACT

A system for positioning vehicle components relative to each other on a floor to prepare an assembly. A plurality of carriers receive a vehicle component. A plurality of positioning tables have a lower portions which can be fixed to the floor and a upper portions which receive a carrier. A location device having at least one base and mobile units moveable relative to the base. At some of the positioning tables moves the respective upper portion along at least two movement axes relative to the respective lower portion to position a carrier located thereon. A transport device guides the carriers from an external position to a positioning table and to place them on the upper portion. The location device determines the positions of the respective mobile units relative to the at least one base. A position control unit controls a movement of the upper portions to a predetermined target position.

11 Claims, 3 Drawing Sheets

SYSTEM AND METHOD FOR POSITIONING VEHICLE COMPONENTS FOR ASSEMBLY

CROSS-REFERENCES TO RELATED APPLICATIONS

This application claims the benefit of European Patent Application Number 22195998-4 filed on Sep. 15, 2022, the entire disclosure of which is incorporated herein by way of reference.

FIELD OF THE INVENTION

The present description relates to a system and method for positioning a plurality of vehicle components relative to each other on a floor in order to prepare an assembly of the vehicle components.

BACKGROUND OF THE INVENTION

During the assembly of components of an aircraft, assembly locations which are provided with an indexing and aircraft components which are secured thereto are orientated with respect to each other based on the indexing are generally used. The precision of this orientation is consequently dependent on the precision of the frame, which makes the equipment for an assembly construction location very cost-intensive and additionally requires particularly costly foundations for a stable, fixed bearing. In addition, regular maintenance operations are required in order always to be able to ensure the necessary precision. A slightly more modern approach involves the use of processing platforms which are movable but which have to be able to perform the three functions of storing, moving and positioning relative to other components. This leads to higher costs since in particular the movement function is required only for moving between the stations and the position functions are required only directly at the assembly location and a cost-effective storage of the individual components is consequently hardly possible.

SUMMARY OF THE INVENTION

An object of the invention is consequently to propose an alternative system, in which a cost-effective storage, movement and orientation of vehicle components and in particular aircraft components in order to prepare the assembly is possible without dispensing with the required precision.

This object may be achieved with the subject-matter of at least one embodiment described herein. Other embodiments will be appreciated from the following description.

A system is proposed for positioning a plurality of vehicle components relative to each other on a floor in order to prepare an assembly of the vehicle components, having a plurality of carriers for receiving a vehicle component in each case, a plurality of positioning tables, having a lower portion and an upper portion, wherein the lower portion can be fixed to the floor, and wherein the upper portion is constructed to receive a carrier, a location device having at least one base and a plurality of mobile units which can be moved relative to the at least one base, at least one transport device and at least one position control unit, wherein at least a part-quantity of the positioning tables is constructed to move the respective upper portion thereof at least along two movement axes relative to the respective lower portion in order to position a carrier which is located thereon, wherein the at least one transport device is constructed to guide the carriers from an external position toward a positioning table and to place them on the upper portion, wherein the location device is constructed to determine the positions of the respective mobile units relative to the at least one base, and wherein the mobile units are arranged on the upper portions of the positioning tables and/or on the vehicle components, wherein the location device and the positioning tables are coupled to the at least one position control unit, and wherein the at least one position control unit is constructed to control a movement of the respective upper portion relative to a predetermined target position over the floor.

The system according to the invention combines a plurality of advantages which are not possible in conventional assembly processes using conventional devices in particular for relatively large vehicles. The aim of the system is to provide a simple-to-use, cost-effective and precise way of moving vehicle components and in particular components for commercial aircraft in order to prepare an assembly at an assembly location and to position them precisely at that location. The positioning should be carried out in this instance in such a manner that subsequently a connection of the components preferably can be carried out directly or only very minor manual adjustment is required if the corresponding assembly process requires it. To this end, there are substantially provided three elements which can be moved relative to each other using a location device. The individual components are described in greater detail below. Advantageous variants are explained below.

The carriers are intended to be understood to be substantially passive devices which can be moved only using a separately configured transport device. They are constructed only to carry a vehicle component and in this instance to stand on the floor or another surface. The carriers could be in the form of pallets, frames, racks or the like. It may be advantageous to use for this already standardized devices, for example, carriers which otherwise are generally used for temporary support of vehicle components. The carriers are constructed in such a manner that they can be placed on an upper side of one or more positioning tables which will be explained below without the vehicle components having to be removed from the carrier. It is consequently possible to provide temporary support of vehicle components with very low costs since the carriers do not have to perform any other functions and are already available as standard components.

The carriers each have a carrier lower side and a carrier upper side. The carrier lower side serves to place the carrier on the floor or on a positioning table or a plurality of positioning tables. The carrier upper side in contrast serves to receive the corresponding vehicle component. It is understandable that the carrier upper side is adapted to the respective vehicle component and, for example, has a separate device which is secured thereto for receiving and retaining the relevant vehicle component which is individually adapted to the corresponding vehicle component. The carriers could be adapted at the carrier lower side directly to the positioning table(s) so that a fixed support of the carrier on the positioning table(s) is possible. Other details in this regard are explained in greater detail below.

It is conceivable for all the carriers not to have the same size. In particular, larger and smaller carriers which are adapted to the relevant vehicle component could be used. Particularly with relatively large components, such as wings, fuselage sections or the like, a single carrier could be accordingly sized and placed on a plurality of positioning tables.

A positioning table is a device which comprises two significant portions and which can be fixed to the floor. It is primarily provided to receive a carrier or a portion of a carrier on the upper portion. At least with a part-quantity of the positioning tables, by moving the upper portion relative to the lower portion a desired target position can be reached. To this end, the positioning table has a corresponding mechanism which enables the upper portion and the lower portion to be moved relative to each other in at least two spatial directions which are referred to in this instance as movement axes. In this instance, it is not necessary for the positioning table to have to be secured to the floor in a positive-locking manner, but instead a frictionally engaging or non-positive-locking fixing could be carried out. If a carrier is placed by the transport device on the positioning table, the precise position or orientation of the carrier can be adjusted by moving the upper portion of the positioning table. Of course, in addition to a purely linear movement, a rotational movement about at least one axis which is orientated vertically with respect to the floor is also conceivable. Standardized positioning table mechanisms which can be used in the system according to the invention are already known. It is further conceivable for one or more positioning tables to be configured in a non-movable manner and, for example, for a vehicle component to be placed on non-movable positioning tables, whilst the vehicle components which are intended to be connected thereto are arranged on movable positioning tables.

The at least one transport device is provided to transport carriers to a positioning table. Since the carriers can also be used according to the invention for temporary support, they may be located for the purposes of this objective in a space other than the assembly or construction location. The at least one transport device could therefore preferably be constructed to also travel greater distances which could include a multiple of the extent of the corresponding vehicle component. The transport device should in this instance be configured to be as compact as possible and preferably be configured to be autonomous. The at least one transport device could, for instance, be in the form of a standardized driverless transport vehicle (AGV, "Automated Guided Vehicle") which can be understood to be a mobile robot. These types of transport device are known in the industrial environment and are used inter alia to move pallets or other objects automatically along floor lines or in a state supported by another auxiliary navigation member on the floor.

The at least one position control unit could be a superordinate control unit which is capable of predetermining or planning and where applicable implementing positions of upper portions of positioning tables. The at least one position control unit could also be in the form of an individual control unit in a positioning table or be connected thereto in order to control a corresponding mechanism at that location.

The location device serves to detect an actual position of a movable mobile unit with respect to at least one base which is positioned in a spatially fixed manner. It is particularly preferable to use a plurality of bases or base stations which are spaced apart from each other in order to be able to carry out common triangulation or trilateration methods. The position detection is carried out without dedicated targets on the individual vehicle components and can be used in a very flexible manner on extremely different vehicle components.

The system according to the invention enables all the components to be stored on cost-effective standard racks or other carriers. In this instance, the complete flexibility of the carriers for different configurations and even sizes of components, for example, fuselage section diameters and lengths and wing sizes is enabled. A preferably fully-automated transport of the carriers with the components located thereon using, for example, already provided, preferably standardized transport devices enables the rapid and simple provision of a component at the assembly location with an already high level of precision. The subsequent adjustment is carried out with similarly standardized positioning tables which are used exclusively at the assembly location. The function of the precise adjustment is accordingly not also provided in carriers for temporary support. On the whole, the complexity and the costs can thereby be significantly reduced. The assembly processes can be very flexibly and rapidly planned and implemented since the individual components can be freely combined. In addition, by using standardized components, a high cost reduction and additionally high redundancy can be implemented.

In an advantageous embodiment, the upper portion has a first receiving means which is constructed to complement a second receiving means on the carrier, wherein the receiving means are constructed to fix the relevant carrier in a fixed manner to the upper portion. The first receiving means could protrude from the upper portion and be in the form of a projection. The second receiving means could, however, comprise a recess which can be placed on the projection. An inverted configuration would also be conceivable should the upper portion have sufficient structural space for providing such a recess. It is preferable for the receiving means to be orientated independently with respect to each other. This can be carried out by means of a type of funnel or guiding function so that, when the carrier is placed on the upper portion, relatively small position deviations of the carrier relative to the upper portion are compensated for. It is additionally particularly preferable for the receiving means in the assembled state to be arranged in a play-free manner on each other so that movements of the upper portion are converted directly into movements of the carrier.

It is conceivable for the first receiving means and the second receiving means to be configured in such a manner that both receiving means can be placed in a fixed manner with respect to each other but enable a rotation relative to each other. Consequently, it is not necessary to carry out a rotation of positioning tables, should the orientation thereof or the orientation of the first receiving means not correspond to the orientation of the second receiving means when the carrier is placed on the positioning table.

In an advantageous embodiment, the positioning tables have on the lower portion a support layer made of a substantially incompressible, slip-resistant material. A slipping of the positioning tables can thereby be at least substantially avoided. The support layer could, for example, comprise a rubber-like material.

In an advantageous embodiment, the positioning tables have at least one movable floor anchor which, in order to anchor the positioning table, can be extended out of the lower portion into a correspondingly formed recess in the floor. Preferably, two such floor anchors are provided so that a positioning table which is placed on the floor can be anchored in corresponding recesses. It is conceivable to use rails having a plurality of recesses, which are arranged in a grid, in the floor. The positioning tables could be transported to the assembly location and anchored there in corresponding recesses. As a result of the floor anchors, a particularly good anchoring is achieved so that the upper portions of the positioning tables can be positioned precisely.

In an advantageous embodiment, the positioning tables each have at a lower side at least one engagement means for receiving and transporting the positioning table. The engagement means could be in the form of one or more recesses. The positioning tables could be freely placed on the floor by a transport means, for example, a forklift truck, receiving the relevant positioning table on the engagement means at one location and depositing it again at another location.

In an advantageous embodiment, the positioning tables are constructed to move the upper portion in three spatial directions with respect to the lower portion. Consequently, an adjustment of the position in the longitudinal, transverse and vertical direction can be carried out. Furthermore, if desired, a rotation of the upper portion about a vertical axis could also be enabled.

In an advantageous embodiment, the positioning tables have for each movement axis an adjustment mechanism which comprises an actuator, wherein the positioning tables each have a control unit which is coupled to the respective actuator and the at least one position control unit and which control the actuators in order to move the upper portion. The position control unit can selectively transmit to the control unit which is arranged in the positioning table a position or movement specification. For example, the position control unit after detecting the actual positions of the mobile units by comparing with desired target positions along all the movement axes could establish a necessary movement path and transmit it to the control unit. The control unit can control the corresponding actuators using this information. Reaching the target position can be carried out by precisely controlling the actuators and locally measuring the movement of the upper portion, for example, by means of corresponding sensors, on the respective adjustment mechanism. Alternatively or additionally, the location device can also be used for this purpose.

In an advantageous embodiment, the actuators are electrical actuators, wherein the positioning tables have an electrical energy store and/or a connection cable which can be connected to a floor-side connection or a supply cable. Particularly with an electrical energy store, the positioning tables are particularly autonomous and can after a corresponding positioning very easily be placed into operation.

In an advantageous embodiment, the at least one position control unit is constructed to establish, from predetermined relative positions of the components with respect to each other, required end positions of the positioning tables and to transmit them to the positioning tables. The transmission is carried out in particular in a wireless manner, preferably using conventional data transmission methods. This additionally increases the simplicity and flexibility of the required infrastructure at the assembly location.

In an advantageous embodiment, the location device is constructed to establish a relative position of a mobile component with respect to the at least one base by means of triangulation or trilateration using light signals or electromagnetic signals. Whilst triangulation is based on the measurement of three or more angles, trilateration is based on distance measurements with respect to three or more base stations.

In an advantageous embodiment, the carriers have a recess at the lower side thereof, wherein the at least one transport device is constructed to assume a compacted state and an extended state, and wherein the recess and the transport device are sized to complement each other so that the transport device can be introduced into the recess in the compacted state and in the extended state lifts the carrier for movement. The transport device can be in the form of a conventional AGV, as mentioned further above.

In an advantageous embodiment, some of the positioning tables are non-movable in order to place a first carrier as a reference carrier on the non-movable positioning tables and to orientate second carriers relative thereto. A first vehicle component can consequently first be arranged at the assembly location and all the other vehicle components which are intended to be connected thereto are subsequently transported in and orientated relative to the vehicle component which is already provided.

The invention similarly relates to a method for positioning a plurality of vehicle components relative to each other on a floor in order to prepare an assembly of the vehicle components, having the steps of: placing a plurality of positioning tables on a floor at an assembly location, wherein the positioning tables have a lower portion and an upper portion, wherein the lower portion is fixed to the floor, transporting a first carrier and at least a second carrier, wherein a vehicle component is arranged on the carriers in each case, from an external position to the assembly location and placing them on the positioning tables, by means of at least one transport device, and moving the upper portions of at least a part-quantity of the positioning tables along at least two movement axes relative to the respective lower portion in order to move a carrier which is located thereon into a target position, wherein at least when the upper portions are moved a position detection of the upper portions and/or the carriers is carried out by means of a location device which comprises a base and a plurality of mobile units which can be moved relative to the at least one base.

In an advantageous embodiment, after the carriers have been placed on the positioning tables, at least one position control unit determines the actual positions of all the vehicle components, compares them with target positions, establishes movements of the upper portions required to reach the target positions and transmits them to the positioning tables.

In an advantageous embodiment, the positioning tables after placement are fixed to the floor by means of a support layer made of a substantially incompressible, slip-resistant material and/or by means of a movable floor anchor.

BRIEF DESCRIPTION OF THE DRAWINGS

Exemplary embodiments are discussed in greater detail below with reference to the appended drawings. The illustrations are schematic and are not true to scale. The same reference numerals refer to identical or similar elements. In the drawings.

DETAILED DESCRIPTION OF THE PREFERRED EMBODIMENTS

Figure 1:
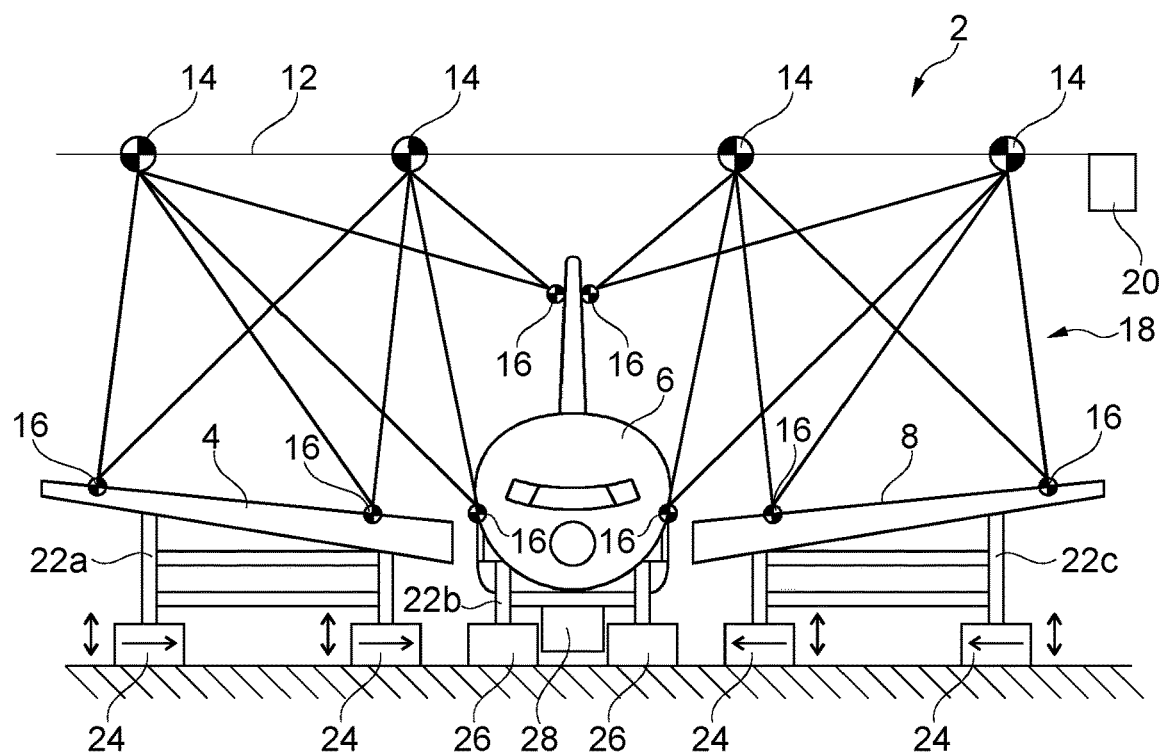
FIG. 1 shows a schematic illustration of a system according to one embodiment.

FIG. 1 shows a system 2 for positioning a plurality of vehicle components 4, 6 and 8 relative to each other on a floor 10 for preparing an assembly of the vehicle components 4, 6, 8. The floor 10 could be a floor in an industrial warehouse and the illustration shown schematically illustrates an assembly location at which the vehicle components 4, 6 and 8 are assembled. By way of example, the vehicle components 4, 6 and 8 are in the form of components of a commercial aircraft, wherein the components 4 and 8 are in each case a wing half and the component 6 is an aircraft fuselage.

The warehouse has a warehouse ceiling 12 which in this illustration is orientated by way of example parallel with the floor 10. On the warehouse ceiling 12 there are arranged a plurality of base stations 14 which form together with a plurality of mobile units 16 which can be moved relative thereto a location device 18. The base stations 14 are fixed in position and arranged to be spaced apart from each other on the warehouse ceiling 12. Of course, the base stations 14 could also be arranged on a rack or frame which is suspended from the warehouse ceiling 12 or could be arranged on a structure which is independent thereof in the industrial warehouse. The location device 18 is constructed to determine the positions of the mobile units 16 by means of triangulation or trilateration with respect to the base stations 14. The location device 18 could in this instance be described as an interior GPS. It is conceivable that the location device 18 has or is connected to a position control unit 20 which is constructed to control a movement of the wing halves 4 and 8 with respect to the aircraft fuselage 6 for precise positioning. This is explained in greater detail below.

The components 4, 6 and 8 are in each case arranged on a carrier 22a, 22b and 22c. These are passive units which are only in the form of a frame, rack or a pallet and are constructed only to accordingly retain the individual components 4, 6 and 8. They are to this end individually adapted to the respective component 4, 6 and 8.

The carriers 22a, 22b and 22c are in this illustration arranged in each case on a plurality of positioning tables 24. They are constructed to carry out a movement of an object located thereon at least in two and preferably three movement axes. For example, the carrier 22b which carries the aircraft fuselage 6 is arranged on two fixed positioning tables 26. The positioning tables 24 can be moved relative thereto in order to position the components 4 and 8, that is to say, the wing halves, precisely on the aircraft fuselage 6.

The individual components 4, 6 and 8 are in each case provided with a plurality of mobile units 16 so that the position and orientation of the individual components 4, 6 and 8 can thereby be established. The position control unit 20 which carries out the positioning detection or obtains the established positions is as a result of the known position data capable of planning correspondingly necessary movements of the components 4 and 8 in order to reach desired target positions.

As will be explained in greater detail below, the individual carriers 22a, 22b and 22c can be moved by means of transport devices 28. The carriers 22a, 22b and 22c can be used for permanent or temporary, cost-effective support of the components 4, 6 and 8 remote from the assembly location without the positioning tables 24 or 26 being used. Only if required can they then be subsequently guided by corresponding transport devices 28 to the assembly location and at that location to the individual positioning tables 24 or 26.

Figure 2:
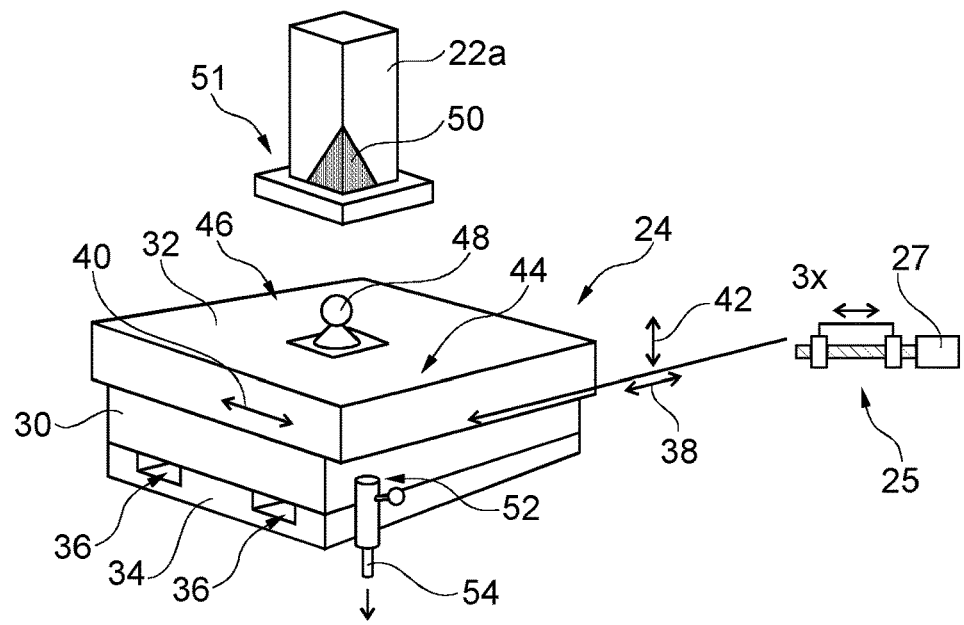
FIG. 2 shows a schematic illustration of a positioning table and a foot of a carrier.

FIG. 2 shows one possible embodiment of a positioning table 24. The positioning table 24 has a lower portion 30 and an upper portion 32, wherein the upper portion 32 can be moved relative to the lower portion 30. The lower portion 30 is in this instance provided by way of example with a slip-resistant support layer 34 which is substantially incompressible and enables a slip-resistant placement of the positioning table 24 on the floor 10.

The positioning table 24 can further be placed on the floor 10 in a flexible manner. To this end, for example, the slip-resistant support layer 34 has recesses 36 which enable receiving by means of a forklift truck or the like. The positioning table 24 can consequently be positioned on the floor 10 by means of a forklift truck in order to subsequently receive a carrier 22a, 22b or 22c at that location. Inside the positioning table 24, there are arranged, for example, three adjustment mechanisms 25 which enable an adjustment along three movement axes 38, 40 and 42. The adjustment mechanisms 25 could, for instance, be in the form of spindle gear mechanisms which are each connected to an electrical actuator 27. There is arranged on an upper side 44 of the upper portion 32 a first receiving means 46 which has, for example, a ball 48. This is provided to carry out a centered, play-free receiving of a second receiving means 50 which is, for example, in the form of an inner cone. The second receiving means 50 is arranged by way of example on a foot 51 of the carrier 22a.

On the lower portion 30 there is, for example, provided a floor anchor 52 which comprises an anchoring rod 54 which can be extended in a vertical direction out of the lower portion 30 in the direction of the floor 10 or can be retracted into the lower portion 30. The positioning table 24 preferably has at least two of these floor anchors 52 in order to enable a torsion-resistant and fixed fixing of the lower portion 30 of the positioning table 24 on the floor 10.

A transport device 28 can consequently receive one of the carriers 22a, 22b and 22c, move it to the corresponding positioning tables 24 or 26 and deposit it at that location. This is illustrated by way of example, with reference to FIG. 3. In this instance, the frames 22b and 22c are arranged for temporary support of the components 6 and 8 and the transport device 28 is located in a recess 56 at a lower side 58 of the carrier 22b. This can be carried out by moving the transport device 28 on the floor 10.

Figure 3:
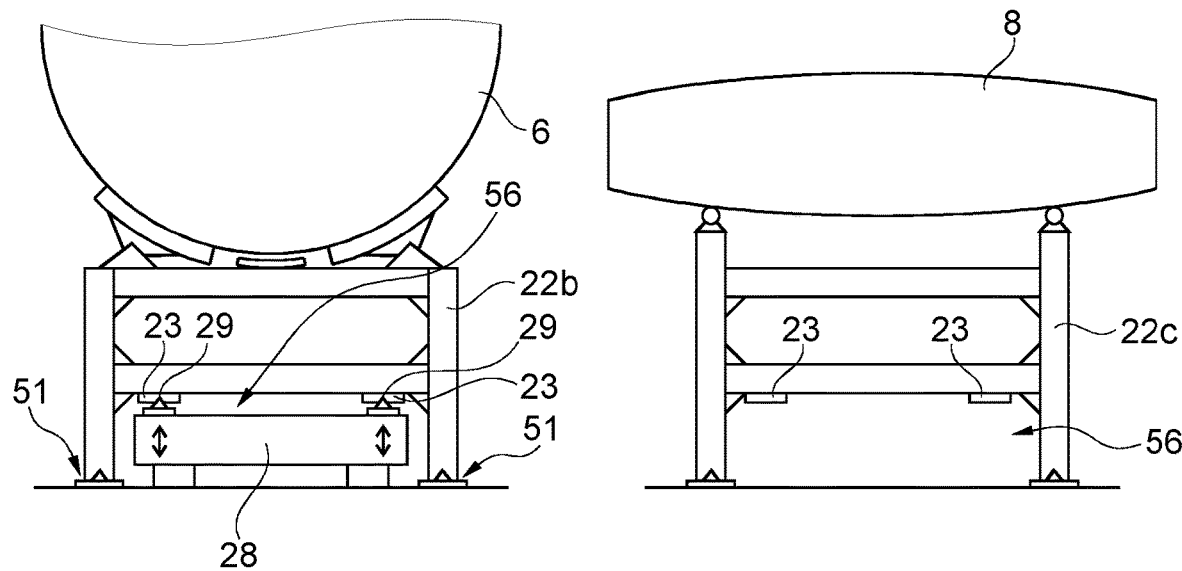
FIG. 3 shows a schematic illustration of two carriers having vehicle components and a transport device for lifting one of the carriers.

To this end, the transport device 28 is constructed to be moved into a retracted state—which is shown in FIG. 3 in this instance—and into an extended state with a relatively significant height. In the illustration from FIG. 3, the transport device 28 has in a vertical direction the smallest possible height and is placed in the recess 56. By subsequently moving into the extended state by lifting carrier faces 29, the transport device 28 can produce a flush contact with corresponding contact faces 23 of the carrier 22b. The carrier 22b is thereby lifted from the floor 10, that is to say, the feet 51 of the carrier 22b no longer touch the floor 10. In this extended state, the transport device 28 can freely move the carrier 22b, for example, on suitable positioning tables 24 or 26.

Figure 4:
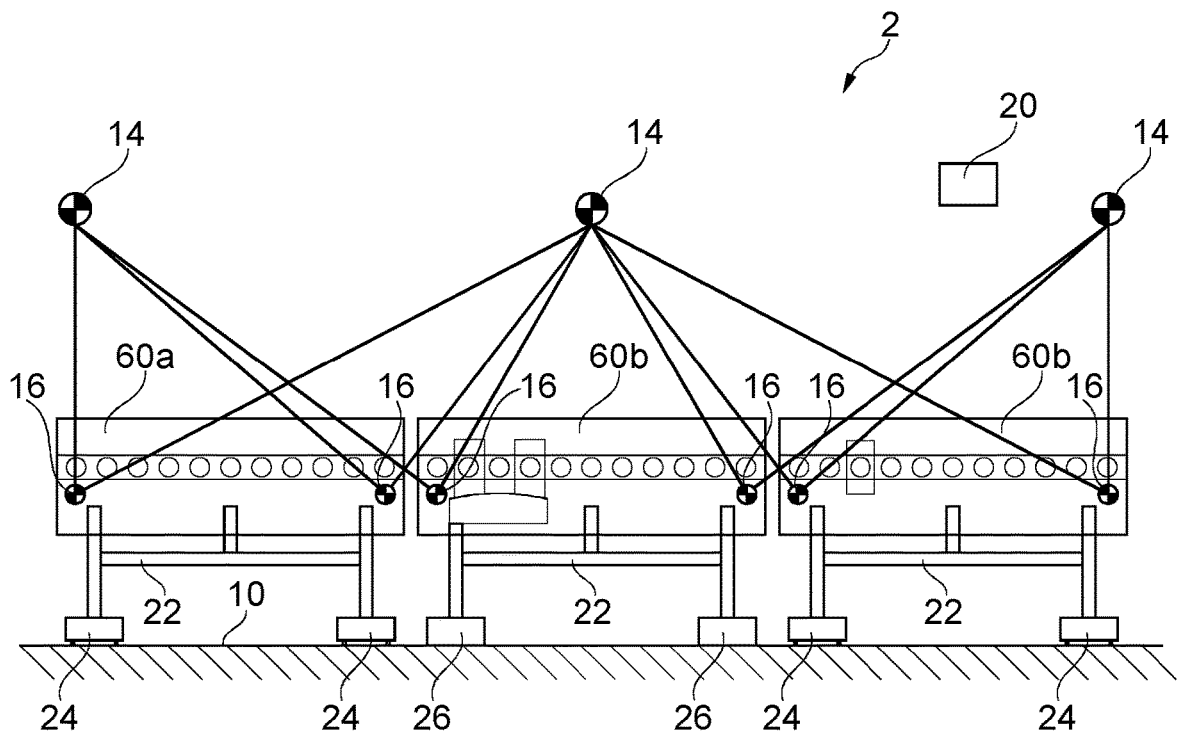
FIG. 4 shows a schematic illustration of a system according to one embodiment.

The system 2 can be used completely freely on different components, wherein in particular large-format components are advantageous for this purpose. FIG. 4 shows by way of example the use of the system 2 for the assembly of a plurality of fuselage portions 60a, 60b and 60c which are positioned in an axial direction with respect to each other in order to subsequently be able to carry out the connection thereof.

Figure 5:
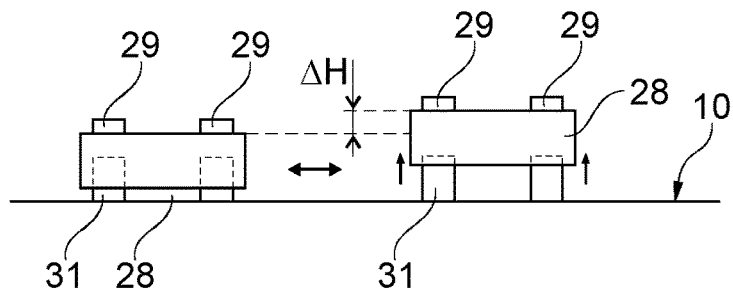
FIG. 5 shows a schematic illustration of a transport device in two different states.

FIG. 5 shows schematic side views of the transport device 28 which has at the lower side thereof wheels 31 for standing and rolling on the floor 10. On the left-hand side, the transport device 28 is located in a compacted state, whilst it is located in an extended state at the right-hand side. This may be carried out, for example, by lifting a frame of the transport device 28 so that the spacing between the carrier faces 29 and the floor 10 can be increased, if necessary. A feasible lifting distance ΔH can be carried out in accordance with the possible carriers 22.

Figure 6:
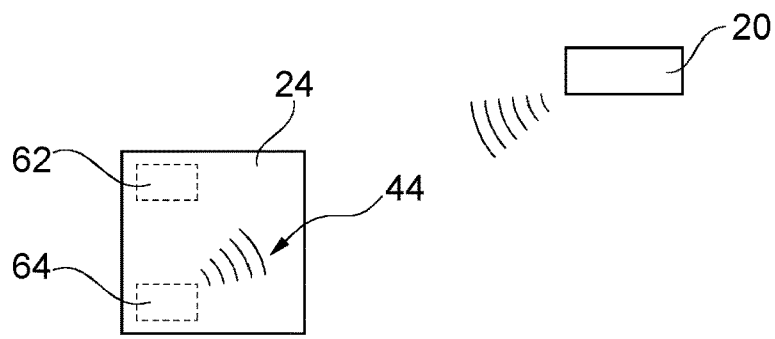
FIG. 6 shows a schematic plan view of a positioning table.

FIG. 6 shows a plan view of a positioning table 24. It is schematically illustrated that the positioning table 24 has, by way of example, an electrical energy store 62 which is coupled to a control unit 64. The control unit 64 may be connected to the electrical actuators 27 in order to directly control them so that the positioning table 24 can accordingly move the upper portion 32. The position control unit 20 is by way of example connected to the control unit 64 by means of a wireless data connection. After the carriers 22 have been placed on all the relevant positioning tables 24, the position control unit 20 can determine the actual positions of all the vehicle components 4, 6, 8, 60, compare them with target positions, establish movements of the upper portions 32 required to reach the target positions and transmit them to the positioning tables 24 or the control unit 64 contained therein. Subsequently, the control unit 64 can implement the required movement in each case. In this instance, the actual position of the relevant vehicle component 4, 6, 8, 60 can be continuously detected until it finally coincides with the desired target position.

Figure 7:
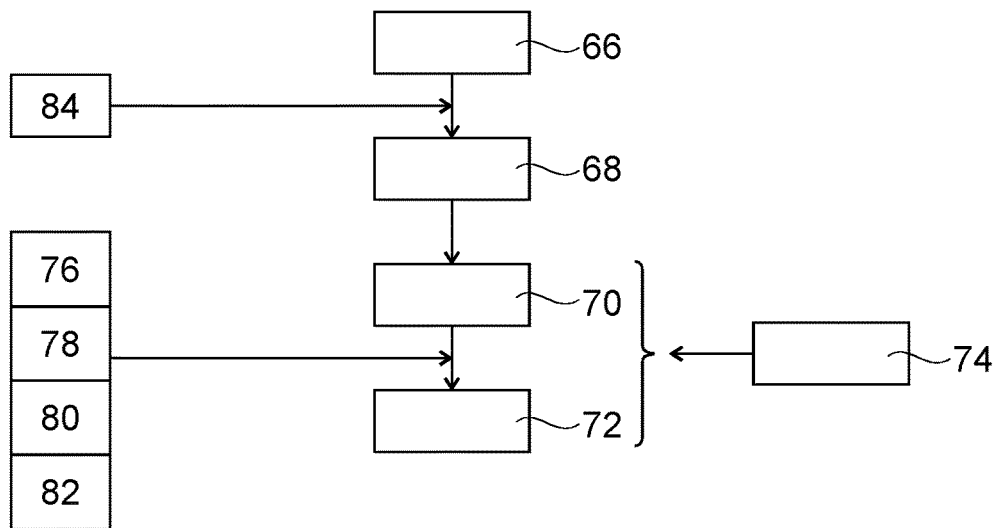
FIG. 7 shows a schematic, block-based illustration of a method for positioning a plurality of vehicle components.

Finally, FIG. 7 shows a schematic illustration of the method for positioning the vehicle components 4, 6, 8, 60 relative to each other on the floor 10 in order to prepare an assembly of the vehicle components 4, 6, 8, 60. The method has, for example, the steps of placing 66 a plurality of positioning tables 24, 26 on the floor 10 at an assembly location, wherein the lower portion 32 is fixed to the floor 10. Subsequently or at the same time, a first carrier 22 and at least a second carrier 22, wherein a vehicle component 4, 6, 8, 60 is arranged in each case on the carriers 22, is transported 68 from an external position to the assembly location and placed 70 on the positioning tables 24, 26. This is carried out by means of at least one transport device 28. The upper portions 32 of at least a part-quantity of the positioning tables 24, 26 are moved 72 along at least two movement axes 38, 40, 42 relative to the respective lower portion 30 in order to move a carrier 22 located thereon into a target position. At least when the upper portions 32 are moved, there is carried out a position detection 74 of the upper portions 32 and/or the carriers 22 by means of the location device 18.

After the carriers 22 have been placed 70 on the positioning tables 24, 26, at least one position control unit 20 establishes 76 the actual positions of all the vehicle components 4, 6, 8, 60, compares them 78 with target positions, establishes 80 movements of the upper portions 32 required to reach the target positions and transmits them 82 to the positioning tables 24, 26. Furthermore, the positioning tables 24, 26 after placement 66 can be fixed 84 to the floor 10 by means of the support layer 34 made of a substantially incompressible, slip-resistant material and/or by means of the movable floor anchor 52.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

2 System
4 Component (wing half)
6 Component (fuselage)
8 Component (wing half)
10 Floor
12 Warehouse ceiling
14 Base/Base station
16 Mobile unit
18 Location device
20 Position control unit
22, 22a, 22b, 22c Carrier
23 Contact face
24 Positioning table
25 Adjustment mechanism
26 Positioning table (fixed)
27 Actuator
28 Transport device
29 Carrier face
30 Lower portion
31 Wheel
32 Upper portion
34 Support layer
36 Recess
38 Movement axis
40 Movement axis
42 Movement axis
44 Upper side
46 First receiving means
48 Ball
50 Second receiving means
51 Foot
52 Floor anchor
54 Anchoring rod
56 Recess
58 Lower side
60a, 60b, 60c Fuselage portion
62 Electrical energy store
64 Control unit
66 Placement of positioning table
68 Transporting carrier
70 Placement of carrier
72 Moving upper portion
74 Position detection
76 Establishing actual positions
78 Comparing with target positions
80 Establishing required movements
82 Transmitting
84 Fixing
ΔH Lifting distance

The invention claimed is:

1. A system for positioning a plurality of vehicle components relative to each other on a floor in order to prepare an assembly of the vehicle components, the system comprising:
a plurality of carriers for receiving a vehicle component in each case;
a plurality of positioning tables, having a lower portion and an upper portion, wherein the lower portion is configured to be fixed to a floor, and wherein the upper portion is configured to receive a carrier;
a location device having at least one base and a plurality of mobile units which are configured to be moved relative to the at least one base;
at least one transport device; and
at least one position control unit,
wherein at least a part-quantity of the positioning tables are configured to move the respective upper portion thereof along at least two movement axes relative to the respective lower portion in order to position a carrier which is located thereon,
wherein the at least one transport device is configured to guide the carriers from an external position toward a positioning table and to place them on the upper portion,
wherein the location device is constructed to determine positions of the respective mobile units relative to the at least one base,
wherein the mobile units are arranged on the upper portions of the positioning tables, the vehicle components, or both,
wherein the location device and the positioning tables are coupled to the at least one position control unit,
wherein the at least one position control unit is configured to control a movement of the respective upper portion relative to a predetermined target position over the floor,
wherein each carrier has a recess at the lower side thereof,
wherein the at least one transport device is configured to assume a compacted state and an extended state, and
wherein the recess and the transport device are sized to complement each other so that the transport device is configured to be introduced in the compacted state into the recess and in the extended state lifts the carrier for movement.

2. The system as claimed in claim 1, wherein the upper portion has a first receiving means which is configured to complement a second receiving means on the carrier, and wherein the first and second receiving means are configured to fix the respective carrier in a fixed manner to the upper portion.

3. The system as claimed in claim 1, wherein the positioning tables have on the lower portion a support layer made of a substantially incompressible, material.

4. The system as claimed in claim 1, wherein the positioning tables have at least one movable floor anchor which, in order to anchor the positioning table, is configured to be extended out of the lower portion into a correspondingly formed recess in the floor.

5. The system as claimed in claim 1, wherein the positioning tables each have at least one engagement means for receiving and transporting the positioning table.

6. The system as claimed in claim 1, wherein the positioning tables are configured to move the upper portion in three spatial directions with respect to the lower portion.

7. The system as claimed in claim 1, wherein the positioning tables have for each movement axis an adjustment mechanism which comprises an actuator, and
wherein the positioning tables each have a control unit which is coupled to the respective actuator and the at least one position control unit and which control the actuators in order to move the upper portion.

8. The system as claimed in claim 7, wherein the actuators are electrical actuators, and
wherein the positioning tables have an electrical energy store, a connection cable, or both which are configured to be connected to a floor-side connection or a supply cable.

9. The system as claimed in claim 1, wherein the at least one position control unit is configured to establish, from predetermined relative positions of the vehicle components with respect to each other, required end positions of the positioning tables and to transmit the required end positions to the positioning tables.

10. The system as claimed in claim 1, wherein the location device is configured to establish a relative position of a mobile component with respect to the at least one base by means of triangulation or trilateration using light signals or electromagnetic signals.

11. The system as claimed in claim 1, wherein some of the positioning tables are non-movable positioning tables in order to place a first carrier as a reference carrier on the non-movable positioning tables and to orientate second carriers relative thereto.

\* \* \* \* \*